US012735343B2

(12) United States Patent
Hata et al.

(10) Patent No.: US 12,735,343 B2
(45) Date of Patent: Sep. 15, 2026

(54) APPARATUS FOR PRODUCING GLASS BASE MATERIAL, AND METHOD FOR PRODUCING GLASS BASE MATERIAL

(71) Applicant: SUMITOMO ELECTRIC INDUSTRIES, LTD., Osaka (JP)

(72) Inventors: Shinobu Hata, Osaka (JP); Yusuke Kubo, Utsunomiya (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 130 days.

(21) Appl. No.: 18/262,391

(22) PCT Filed: Mar. 3, 2022

(86) PCT No.: PCT/JP2022/009171
§ 371 (c)(1),
(2) Date: Jul. 21, 2023

(87) PCT Pub. No.: WO2022/186341
PCT Pub. Date: Sep. 9, 2022

(65) Prior Publication Data

US 2024/0076223 A1 Mar. 7, 2024

(30) Foreign Application Priority Data

Mar. 3, 2021 (JP) ................................ 2021-033641

(51) Int. Cl.
*C03B 19/10* (2006.01)
*G01B 11/16* (2006.01)

(52) U.S. Cl.
CPC ........... *C03B 19/106* (2013.01); *G01B 11/16* (2013.01)

(58) Field of Classification Search
None
See application file for complete search history.

(56) References Cited

U.S. PATENT DOCUMENTS

2006/0086148 A1* 4/2006 Mileo ................ C03B 37/0124 65/382
2006/0183623 A1 8/2006 Ikuta et al.
2012/0103023 A1* 5/2012 Ishihara ............... C03B 37/014 65/382

FOREIGN PATENT DOCUMENTS

CN 1272631 A 11/2000
EP 1014070 A2 6/2000
(Continued)

OTHER PUBLICATIONS

JP-2000072468-A Machine Translation by Clarivate Analytics retrieved Aug. 22, 2025. (Year: 2025).*
(Continued)

*Primary Examiner* — Lisa L Herring
(74) *Attorney, Agent, or Firm* — McDonald Hopkins LLC

(57) ABSTRACT

An apparatus for producing a glass preform is an apparatus by pulling up a starting rod while the starting rod is rotated around an axis and glass fine particles generated by a burner are deposited in an axial direction of the starting rod. The apparatus for producing a glass preform includes an imaging device that acquires a deposition surface image by imaging a deposition surface of a glass fine particle deposit deposited on the starting rod, and an image processing unit that detects an edge shape of the deposition surface from the deposition surface image acquired using the imaging device to judge quality of the glass fine particle deposit by quantifying a degree of deformation of the edge shape.

6 Claims, 8 Drawing Sheets

(56) References Cited

FOREIGN PATENT DOCUMENTS

| | | | | | |
|---|---|---|---|---|---|
| JP | H05-105469 | A | | 4/1993 | |
| JP | H0672734 | A | * | 3/1994 | ....... C03B 37/01466 |
| JP | H07198966 | A | * | 8/1995 | ......... C03B 37/0142 |
| JP | H07223834 | A | * | 8/1995 | ......... C03B 37/0142 |
| JP | H0834632 | A | * | 2/1996 | ....... C03B 37/01406 |
| JP | H08-239229 | A | | 9/1996 | |
| JP | H0967130 | A | * | 3/1997 | ....... C03B 37/01486 |
| JP | 2000072468 | A | * | 3/2000 | ....... C03B 37/01228 |
| JP | 2005-179088 | A | | 7/2005 | |
| JP | 3843780 | B2 | * | 11/2006 | ......... C03B 37/0142 |
| JP | 2009-107874 | A | | 5/2009 | |
| JP | 2013-234078 | A | | 11/2013 | |
| JP | 2015-078083 | A | | 4/2015 | |

OTHER PUBLICATIONS

JP-H0672734-A Machine Translation by Clarivate Analytics retrieved Aug. 22, 2025. (Year: 2025).*

JP-H0834632A EPO Machine Translation retrieved Aug. 21, 2025. (Year: 2025).*

JP-H0946130A EPO Machine Translation retrieved Aug. 21, 2025. (Year: 2025).*

JP-3843780-B2 Machine Translation by Clarivate Analytics retrieved Apr. 8, 2026. (Year: 2026).*

JP-H07223834-A Machine Translation by Clarivate Analytics retrieved Apr. 8, 2026. (Year: 2026).*

JP-H071898966-A Machine Translation by Clarivate Analytics retrieved Apr. 8, 2026. (Year: 2026).*

International Search Report issued in Patent Application No. PCT/JP2022/009171 dated Apr. 19, 2022.

* cited by examiner (a)
105a
H
(b)
105b
H1
(c)
105c
H2
(d)
105d
H3

APPARATUS FOR PRODUCING GLASS BASE MATERIAL, AND METHOD FOR PRODUCING GLASS BASE MATERIAL

TECHNICAL FIELD

The present disclosure relates to an apparatus for producing a glass preform and a method for producing a glass preform. This application claims the benefit of priority from Japanese Patent Application No. 2021-033641, filed on Mar. 3, 2021, the entire content of which is incorporated herein by reference.

BACKGROUND ART

Patent Literature 1 discloses a method for controlling movement of a burner by imaging a deposition state of glass fine particles using a TV camera and detecting deformation of a tip shape of a glass fine particle deposit when an optical fiber preform is produced by a vapor-phase axial deposition (VAD) method.

CITATION LIST

Patent Literature

[Patent Literature 1] Japanese Unexamined Patent Publication No. H5-105469

[Patent Literature 2] Japanese Unexamined Patent Publication No. 2009-107874

[Patent Literature 3] Japanese Unexamined Patent Publication No. H8-239229

[Patent Literature 4] Japanese Unexamined Patent Publication No. 2013-234078

SUMMARY OF INVENTION

Technical Problem

The present disclosure relates to an apparatus for producing a glass preform by pulling up a starting rod while the starting rod is rotated around an axis and glass fine particles generated by a burner are deposited in an axial direction of the starting rod. The apparatus for producing a glass preform includes an imaging device that acquires a deposition surface image by imaging a deposition surface of a glass fine particle deposit deposited on the starting rod, and an image processing unit that detects an edge shape of the deposition surface from the deposition surface image acquired using the imaging device and judges quality of the glass fine particle deposit by quantifying a degree of deformation of the edge shape.

The present disclosure relates to a method for producing a glass preform by pulling up a starting rod while the starting rod is rotated around an axis and glass fine particles generated by a burner are deposited in an axial direction of the starting rod. The method for producing a glass preform includes acquiring a deposition surface image by imaging a deposition surface of a glass fine particle deposit deposited on the starting rod, detecting an edge shape of the deposition surface from the deposition surface image, and judging quality of the glass fine particle deposit by quantifying a degree of deformation of the detected edge shape.

DESCRIPTION OF EMBODIMENT

Figure 1:
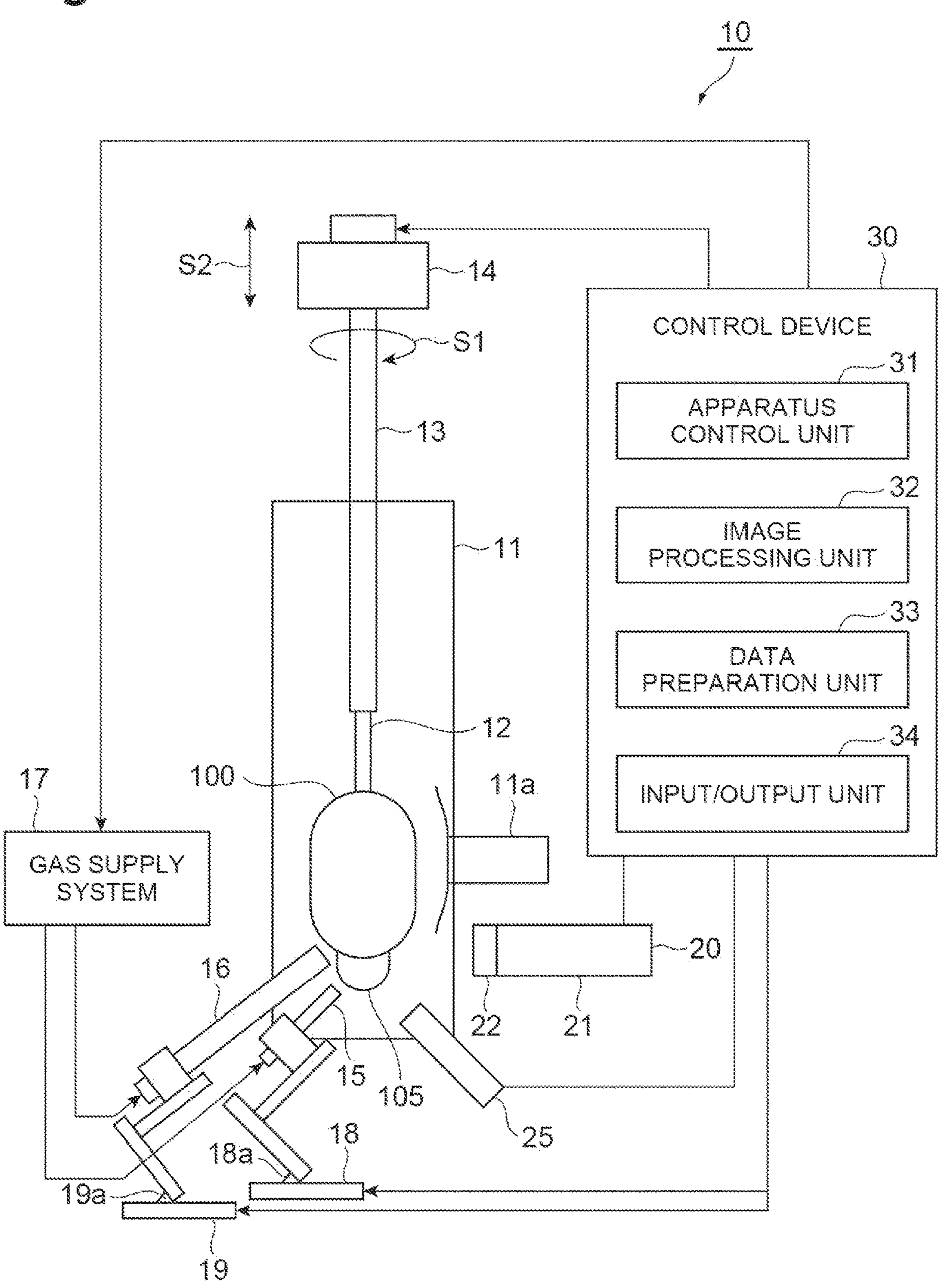
FIG. 1 is a view illustrating an example of a constitution of an apparatus for producing a glass preform according to an embodiment of the present disclosure.

Problem to be Solved by Present Disclosure

In the method for producing an optical fiber preform disclosed in Patent Literature 1, deformation of a tip shape of a glass fine particle deposit (which ultimately constitutes a part of an optical fiber preform) is mainly detected by image analysis. However, it is difficult to promptly respond to various kinds of deformation of a glass fine particle deposit simply by this detection. Therefore, it is desired to be able to promptly respond to deformation of a glass fine particle deposit when an optical fiber preform is produced.

Effects of Present Disclosure

According to the present disclosure, it is possible to promptly respond to deformation of a glass fine particle deposit.

Description of Embodiment of Present Disclosure

First, details of embodiments of the present disclosure will be enumerated and described. An apparatus for producing a glass preform according to an embodiment of the present disclosure is an apparatus pulling up a starting rod while the starting rod is rotated around an axis and glass fine particles generated by a burner are deposited in an axial direction of the starting rod. The apparatus includes an imaging device that acquires a deposition surface image by imaging a deposition surface of a glass fine particle deposit deposited on the starting rod, and an image processing unit that detects an edge shape of the deposition surface from the deposition surface image acquired using the imaging device and judges quality of the glass fine particle deposit by quantifying a degree of deformation of the edge shape.

The apparatus for producing a glass preform includes the image processing unit that detects the edge shape of the deposition surface from the deposition surface image acquired by the imaging device and judges the quality of the glass fine particle deposit by quantifying the degree of deformation of the edge shape. Instead of simple image comparison, the quality of the glass fine particle deposit is judged in this case by quantifying the degree of deformation of the edge shape in the deposition surface image, and thus finer judgment can be performed. According to this apparatus, it is possible to promptly respond to deformation of the glass fine particle deposit. Since the degree of deformation on the deposition surface during production of a glass preform is quantified (digitized) in this manner, a large amount of production data can be used for analysis, and thus prediction of deformation and automation or simplification of maintenance of the production apparatus can also be achieved.

According to an embodiment, the image processing unit may judge the quality through quantification by classifying degrees of deformation of the edge shape by kind of deformation. Since quality judgment of the glass fine particle deposit can be more finely performed in this case, it is possible to more promptly respond to deformation of the glass fine particle deposit. In this embodiment, the kind of deformation may include deformation of a tip portion of the glass fine particle deposit, rotationally asymmetric deformation in a tip portion of the glass fine particle deposit, and deformation on a side surface of the glass fine particle deposit. These kinds of deformation may require different responding (change in production conditions, and the like) even after judgment of the presence of deformation. Responding thereafter can be facilitated by performing responding in advance through classification by kind of deformation.

According to an embodiment, the above apparatus for producing a glass preform may further include a data preparation unit that prepares production data obtained by associating data of the degree of deformation quantified by the image processing unit with positional data (pulling-up length) of the glass fine particle deposit in the axial direction corresponding to the data of the degree of deformation. A part of the glass fine particle deposit regarded as defective by quality judgment can be more precisely removed in a succeeding step in this case. That is, if the range regarded as defective in quality judgment is unclear, there is a need to discard a glass preform constituted of the glass fine particle deposit over the entire length thereof, or in the case of partial discarding, there is a need to discard a generous amount thereof in consideration of safety. Instead, only a defective part can be more precisely removed by preparing such production data.

A method for producing a glass preform according to an embodiment of the present disclosure is a method for pulling up a starting rod while the starting rod is rotated around an axis and glass fine particles generated by a burner are deposited in an axial direction of the starting rod. The method for producing a glass preform includes acquiring a deposition surface image by imaging a deposition surface of a glass fine particle deposit deposited on the starting rod, detecting an edge shape of the deposition surface from the deposition surface image, and judging quality of the glass fine particle deposit by quantifying a degree of deformation of the detected edge shape.

In the method for producing a glass preform, the edge shape of the deposition surface is detected from the deposition surface image, and the quality of the glass fine particle deposit is judged by quantifying the degree of deformation of the detected edge shape. Instead of simple image comparison, the quality of the glass fine particle deposit is judged in this case by quantifying the degree of deformation of the edge shape in the deposition surface image, and thus finer judgment can be performed. Accordingly, it is possible to promptly respond to deformation of the glass fine particle deposit. Since the degree of deformation on the deposition surface during production of a glass preform is quantified (digitized) in this manner, a large amount of production data can be used for analysis, and thus prediction of deformation and automation or simplification of maintenance of the production apparatus can also be achieved.

According to an embodiment, in the judging quality, the quality may be judged through quantification by classifying degrees of deformation of the edge shape by kind of deformation. Since quality judgment of the glass fine particle deposit can be more finely performed in this case, it is possible to far more promptly respond to deformation of the glass fine particle deposit. In this embodiment, the kind of deformation may include deformation of a tip portion of the glass fine particle deposit, rotationally asymmetric deformation in a tip portion of the glass fine particle deposit, and deformation on a side surface of the glass fine particle deposit. The kind of deformation may further include deformation due to cracking of the glass fine particle deposit or deformation due to adhesion of foreign matter to the glass fine particle deposit.

According to an embodiment, the above method for producing a glass preform may further include changing a production condition of the glass fine particle deposit on the basis of the degree of deformation quantified in the judging quality and the kind of deformation. A production condition can be more promptly changed with respect to the glass fine particle deposit in which deformation has occurred in this case, and thus a defective part of the glass fine particle deposit can be made shorter.

According to an embodiment, in the acquiring an image, the deposition surface image may be acquired by irradiating the deposition surface of the glass fine particle deposit with light having a wavelength of 300 nm to 600 nm from a light source. In a method for producing an optical fiber preform, strong light is emitted from flames of the burner. However, an image is acquired by irradiating a position where an edge is emphasized with light within such a wavelength range, and thus an edge part of the glass fine particle deposit can be made clearer and image processing can be facilitated. Accordingly, accuracy of judgment based on the deposition surface image in the judging quality can be enhanced.

According to an embodiment, in the acquiring an image, the deposition surface image may be acquired through an optical filter having light transmission characteristics which pass through light having any wavelength range within a wavelength range of 350 nm to 510 nm. In the method for producing an optical fiber preform, strong light is emitted from flames of the burner. However, an image is acquired by blocking light from the burner through the optical filter having such light transmission characteristics, and thus the edge part of the glass fine particle deposit can be made clearer and image processing can be facilitated. Accordingly, accuracy of judgment based on the deposition surface image in the judging quality can be enhanced.

According to an embodiment, the above method for producing a glass preform may further include issuing a predetermined notification when the degree of deformation exceeds a predetermined value in the judging quality. In this case, necessary measures can be taken in an early stage with respect to deformation of the glass fine particle deposit which has been more finely judged.

According to an embodiment, the above method for producing a glass preform may further include removing a defective part inside the glass fine particle deposit on the basis of production data obtained by associating data of the degree of deformation quantified in the judging quality with positional data of the glass fine particle deposit in the axial direction corresponding to the data of the degree of deformation. Apart of the glass fine particle deposit regarded as defective by quality judgment can be more precisely removed in a succeeding step (for example, after going through a step of dehydration/sintering and a step of stretching) in this case. That is, if the range regarded as defective in quality judgment is unclear, there is a need to discard a glass preform constituted of the glass fine particle deposit over the entire length thereof, or in the case of partial discarding, there is a need to discard a generous amount thereof in consideration of safety. Instead, only a defective part can be more precisely removed by preparing such production data.

Details of Embodiment of Present Disclosure

Specific examples of an apparatus for producing a glass preform and a method for producing a glass preform according to the present disclosure will be described with reference to the drawings. The present invention is not limited to these examples. The present invention is indicated by the claims, and it is intended to include all the changes within the meaning and the scope equivalent to the claims. The same reference signs will be applied to the same elements in description of the drawings, and duplicate description thereof will be omitted.

FIG. 1 is a view illustrating an example of a constitution of an apparatus for producing a glass preform according to an embodiment of the present disclosure. As illustrated in FIG. 1, a production apparatus 10 for a glass preform is an apparatus for producing a glass fine particle deposit 100 (which ultimately constitutes a part of an optical fiber preform) by pulling up a starting rod 12 while the starting rod 12 is rotated around an axis and glass fine particles generated by burners 15 and 16 are deposited in an axial direction of the starting rod 12. The production apparatus 10 for a glass preform includes a reaction container 11, a support rod 13 supporting the starting rod 12, a lifting/lowering rotation device 14, the core burner 15, the cladding burner 16, a gas supply system 17, stages 18 and 19, an imaging device 20, a light source 25, and a control device 30. Such a production apparatus 10 is used when a glass preform is produced by a vapor phase axial deposition (VAD) method, for example. Hereinafter, a case of being mainly used by a VAD method will be described as an example. However, it should be easy for those skilled in the art to understand that the constitution of the production apparatus 10 (mainly, the imaging device 20, the control device 30, and the like) can be applied to an outside vapor deposition (OVD) method.

The reaction container 11 is a member for producing the glass fine particle deposit 100 therein, and an exhaust duct **11*a* is attached thereto. The inside of the reaction container 11 is constituted such that the core burner 15, the cladding burner 16, and a part of the support rod 13 in which the starting rod 12** that is a starting glass rod for causing glass fine particles to be deposited is attached to one end thereof are positioned. As an example, the starting glass rod is a glass rod made of quartz glass having a diameter of 25 mm and a length of 400 mm.

The other end of the support rod 13 is supported by the lifting/lowering rotation device 14, and the lifting/lowering rotation device 14 rotates the support rod 13 along the arrow S1 in FIG. 1 and lifts and lowers the support rod 13 in a direction indicated by the arrow S2. Operation of the lifting/lowering rotation device 14 is controlled by the control device 30. The control device 30 individually performs gas flow rate control with respect to the gas supply system 17, positional control of the stage 18 for the core burner and an angle adjustment mechanism **18*a* provided on the stage 18, and positional control of the stage 19 for the cladding burner and an angle adjustment mechanism 19*a* provided on the stage 19** in accordance with control conditions input from the outside.

In the example of FIG. 1, the core burner 15 has a plurality of pipes (disposed in a concentric circle shape) having different outer diameters. Glass raw material gas ($SiCl_4$ and $GeCl_4$) supplied from the gas supply system 17 is introduced into the pipe having the smallest diameter (the pipe on the innermost side). Fuel gas ($H_2$), supporting gas ($O_2$), and burner seal gas ($N_2$) are individually introduced into other spaces. Inside flames of the core burner 15, glass fine particles ($SiO_2$) and a refractive index adjustment dopant ($GeO_2$) are generated due to hydrolysis reaction and combustion reaction of the glass raw material gas (which will be describe below), and glass fine particles generated inside flames are sprayed from the core burner 15 to the glass fine particle deposit 100. The burner seal gas is gas which is introduced to prevent heat deterioration in a burner tip and deposition of glass fine particles at the burner tip, and functions to separate the glass raw material gas, the fuel gas, and the supporting gas from each other in the vicinity of a pipe end of the core burner 15.

$$SiCl_4+2H_2O \rightarrow SiO_2+4HCl$$

$$GeCl_4+O_2 \rightarrow GeO_2+2Cl_2$$

The structure of the cladding burner 16 is almost the same as the structure of the core burner 15 described above, but a kind of a raw material of the refractive index adjustment dopant included in the glass raw material gas supplied from the gas supply system 17 to the cladding burner 16 is different from that. For example, when fluorine (F) is added to a cladding part as a refractive index adjustment dopant, the glass raw material gas includes $CF_4$ together with $SiCl_4$. When the refractive index of the cladding part is not adjusted, the glass raw material gas may not include the raw material of the refractive index adjustment dopant.

The imaging device 20 is a device to acquire a deposition surface image by imaging a deposition surface 105 of the glass fine particle deposit 100 deposited on the starting rod 12. For example, the imaging device 20 includes a camera unit 21 in which a CCD or a CMOS is used as an imaging element, and an optical filter 22 which is provided on an input side of the camera unit 21. For example, the optical filter 22 is an optical filter having light transmission characteristics with respect to light having any wavelength range (for example, a wavelength range of 420 nm to 510 nm) within a wavelength range of 350 nm to 510 nm. The aforementioned light transmission characteristics denotes that 95% or more of light having a wavelength within a wavelength range of 350 nm to 510 nm is transmitted and light having a wavelength out of this range is cut to 1% or less without being transmitted, for example, when the optical filter 22 has light transmission characteristics with respect to light having a wavelength within a wavelength range of 350 nm to 510 nm. In a method for producing an optical fiber preform, strong light is emitted at least from flames of the core burner 15. The camera unit 21 acquires an image by blocking light from flames of this core burner 15 by the optical filter 22 and selecting light from the light source 25 used for irradiation such that an edge of the glass fine particle deposit 100 is emphasized. Accordingly, the edge part of the deposition surface 105 of the glass fine particle deposit 100 can be made clearer and image processing can be facilitated.

When taking images of the glass fine particle deposit 100, the imaging device 20 continuously takes images of the deposition surface 105 of the glass fine particle deposit 100 rotating in a direction S1 by the lifting/lowering rotation device 14, that is, acquires motion video data. Since the imaging device 20 takes images of the glass fine particle deposit 100 rotating in this manner, deposition surface images may be acquired by taking images of the deposition surface 105 from only one side of a rotation axis. During taking images, the imaging device 20 may misrecognize a boundary surface of an edge part due to reflection of a background such as a soot flow floating inside the reaction container 11. In such a case, the reflected part may be blurred by slowing down a shutter speed of the camera unit 21 of the imaging device 20 to facilitate recognition of the boundary surface of the edge part. In this case, for example, taking images may be performed at a shutter speed of 0.1 seconds to 0.5 seconds.

In order to facilitate image processing, the imaging device 20 further includes the light source 25 to irradiate the glass fine particle deposit 100 with light. The wavelength of the irradiation light from the light source 25 may be 300 nm to 600 nm. The light source 25 is preferably disposed to irradiate at least the deposition surface 105 on a side opposite to a deposition surface coming into contact with flames of the core burner 15. In the method for producing an optical fiber preform, strong light is emitted from burner flames. However, the camera unit 21 acquires an image by blocking light from the core burner 15 through the optical filter 22 and selecting light from the light source 25 used for irradiation such that an edge is emphasized. Accordingly, the edge part of the deposition surface 105 of the glass fine particle deposit 100 can be made clearer and image processing can be facilitated. That is, according to the foregoing constitution, at least reflection of flames of the core burner 15 can be curbed, and the edge part of the deposition surface 105 can be more accurately extracted.

The imaging device 20 may be a thermography camera. As the thermography camera, a thermal (passing through flame) imaging camera having a shooting wavelength of 3.7 μm to 4.1 μm may be used. For example, the thermal imaging camera includes a camera unit in which a microbolometer is used as an imaging element, and an optical filter provided on the input side of the camera unit and having light transmission characteristics with respect to infrared light having a wavelength of 3.7 μm to 4.1 μm. Since the glass fine particle deposit 100 is heated up to several hundred Celsius degrees due to flames from the core burner 15 and the cladding burner 16, infrared light having a wavelength of 1 μm to 10 μm is widely radiated from the glass fine particle deposit 100. Strong infrared light is also emitted from flames of the core burner 15, but there is little infrared light having a wavelength of 3.7 μm to 4.1 μm. In the thermal imaging camera, the camera unit acquires an image by blocking infrared light from the core burner 15 through the optical filter and selecting infrared light radiated from the glass fine particle deposit 100. Accordingly, the edge part of the deposition surface 105 can be more accurately extracted in a manner similar to that described above without using any particular light source.

Figure 2:
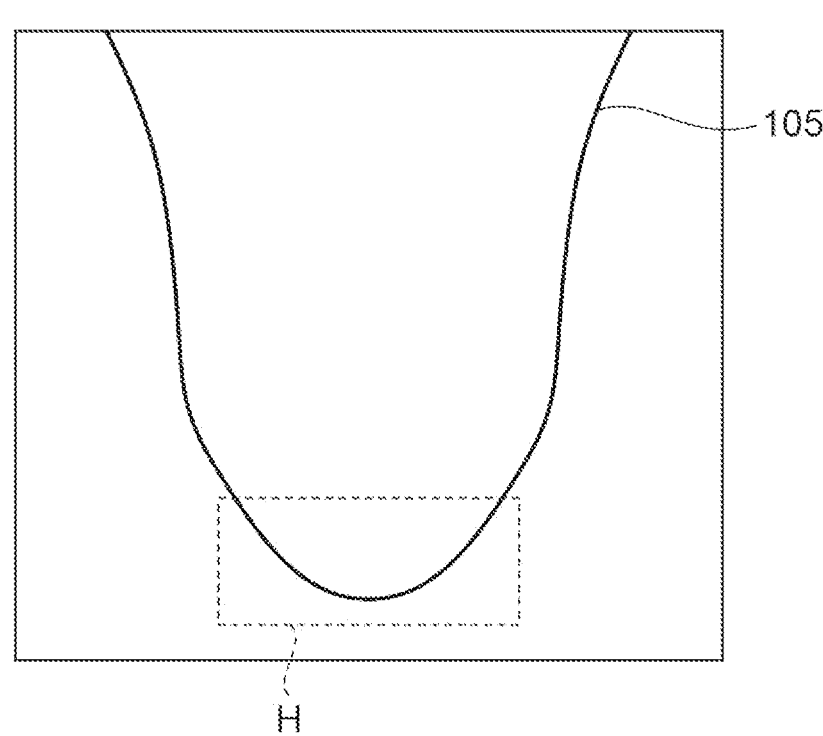
FIG. 2 is a view illustrating an example of a deposition surface image of a glass fine particle deposit in which no deformation has occurred.
Figure 3:
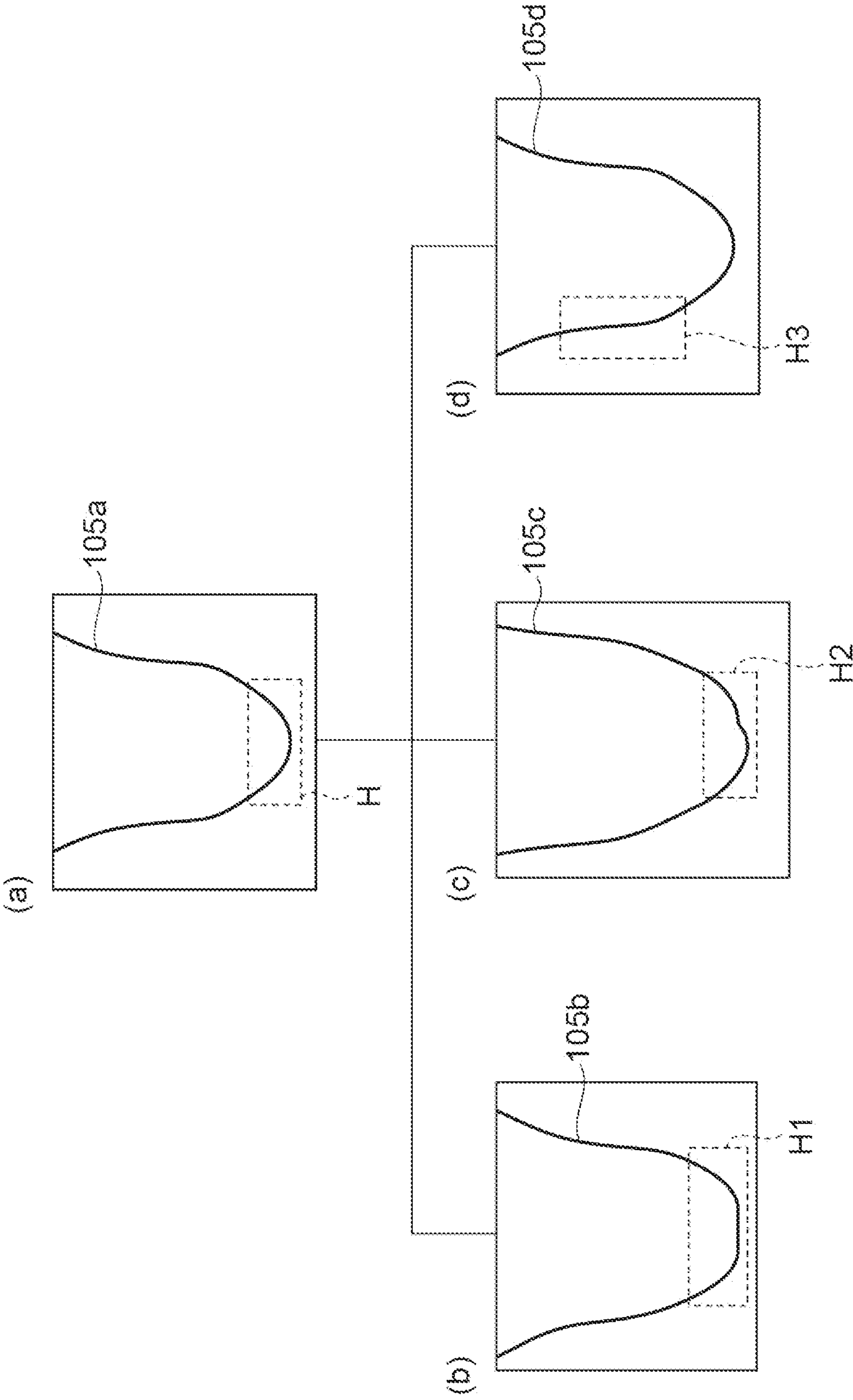
FIG. 3 is a view illustrating an example of deposition surface images of the glass fine particle deposit. Portion (a) illustrates an example of a deposition surface image in which no deformation has occurred, Portion (b) illustrates an example of a deposition surface image in which a tip portion has deformed in a flat manner, Portion (c) illustrates an example of a deposition surface image in which a tip portion has deformed in a rotationally asymmetric manner, and Portion (d) illustrates an example of a deposition surface image in which a side surface has deformed.

The imaging device 20 having such a constitution can acquire an image as illustrated in FIG. 2, for example, through continuous taking images as a deposition surface image of the deposition surface 105 of the glass fine particle deposit 100. FIG. 2 is a view illustrating an example of an image of the deposition surface 105 of the glass fine particle deposit 100. The imaging device 20 continuously acquires deposition surface images while the glass fine particle deposit 100 is produced, and in addition to an image having no deformation illustrated in portion (a) of FIG. 3, images illustrated in portion (b), portion (c) and portion (d) of FIG. 3 may also be acquired. FIG. 3 is a view illustrating an example of each deposition surface image of a glass fine particle deposit, portion (a) illustrates an example of an image of a deposition surface 105*a* including a tip portion H in which no deformation has occurred, portion (b) illustrates an example of an image of a deposition surface 105*b* in which a tip portion H1 has deformed in a flat manner, portion (c) illustrates an example of an image of a deposition surface 105*c* in which a tip portion H2 has deformed in a rotationally asymmetric manner, and portion (d) illustrates an example of an image of a deposition surface 105*d* in which a side surface H3 has deformed. The imaging device 20 transmits deposition surface images (moving image data) acquired in this manner to the control device 30 (image processing unit 32). The deposition surface 105 (105*a* to 105*d*) is a deposition surface of a part in which glass fine particles are deposited by the core burner 15 and is not a deposition surface of a part in which glass fine particles are deposited by the cladding burner 16. The deformation described above is deformation on the deposition surface of a part in which glass fine particles are deposited by the core burner 15.

Returning to FIG. 1, description will continue. As illustrated in FIG. 1, the control device 30 is a control device for performing control of a turning operation S1 and a lifting/lowering operation S2 of the lifting/lowering rotation device 14, flow rate adjustment for gas supplied from the gas supply system 17, movement adjustment (also including angle adjustment) using the stages 18 and 19 of the core burner 15 and the cladding burner 16, and processing of a deposition surface image acquired using the imaging device 20. The control device 30 functionally includes an apparatus control unit 31, the image processing unit 32, a data preparation unit 33, and an input/output unit 34. For example, such a control device 30 is constituted of a computer or the like and includes a central processing unit (CPU), a storage medium such as a memory, and an input/output interface. The control device 30 performs various kinds of operation such as control, adjustment, and processing described above by causing the CPU to execute various kinds of programs or data stored in the storage medium. The control device 30 also receives a signal from the outside (for example, a video signal) through the input/output interface and transmits a signal (for example, a control signal) to the outside. All or an arbitrary part of processing functions performed by respective functional blocks of the control device 30 can be realized through various kinds of programs or the like executed by the CPU.

The apparatus control unit 31 performs control of the turning operation S1 and the lifting/lowering operation S2 of the lifting/lowering rotation device 14, flow rate adjustment for gas supplied from the gas supply system 17, and movement adjustment (including angle adjustment) using the stage 18 of the core burner 15 and the stage 19 of the cladding burner 16. Since many parts of the foregoing control have been performed in the related art, detailed description thereof will be omitted.

The image processing unit 32 detects an edge shape of the deposition surface 105 from a deposition surface image of the glass fine particle deposit 100 acquired using the imaging device 20 and judges the quality of the glass fine particle deposit 100 by quantifying (digitizing) the degree of deformation of this edge shape. When motion video (video image) data is acquired from the imaging device 20, the image processing unit 32 divides the motion video data into two-dimensional images (still images) and extracts the edge shape of the deposition surface 105 from the obtained two-dimensional images (still images). Then, the image processing unit 32 judges whether or not deformation has occurred on each deposition surface 105 for each kind of deformation from the extracted edge shapes. This judgment can be performed through comparison between digitized data (a threshold is set for each kind of deformation) of an image in which no deformation has occurred and digitized data of still images from an acquired image. When it is judged that no deformation has occurred on the deposition surface 105 (when it is equal to or lower than the threshold), the image processing unit 32 determines that no deformation has occurred on the deposition surface 105 and ends the processing.

On the other hand, when it is judged that deformation has occurred on the deposition surface 105 in accordance with each kind of deformation, that is, according to any kind of deformation (when it exceeds any threshold), the image processing unit 32 calculates a deformation amount (degree of deformation) for each kind of deformation. The calculation of the deformation amount and the judgment of the presence or absence of deformation may be processed at the same time. Here, the kinds of deformation on the deposition surface 105 of the glass fine particle deposit 100 will be described. In the judgment of deformation and the calculation of the deformation amount described above, for example, as illustrated in FIG. 3, the kinds of deformation are classified into three kinds of deformation, such as (1) deformation of the tip portion H1 of the glass fine particle deposit 100 (flat tip/projection), (2) rotationally asymmetric deformation in the tip portion H2 of the glass fine particle deposit 100, and (3) deformation on the side surface H3 of the glass fine particle deposit 100, and performs processing of judgment and processing of calculation of the deformation amount. After that, the deformation amount is quantitatively calculated for each kind of deformation.

Figure 4:
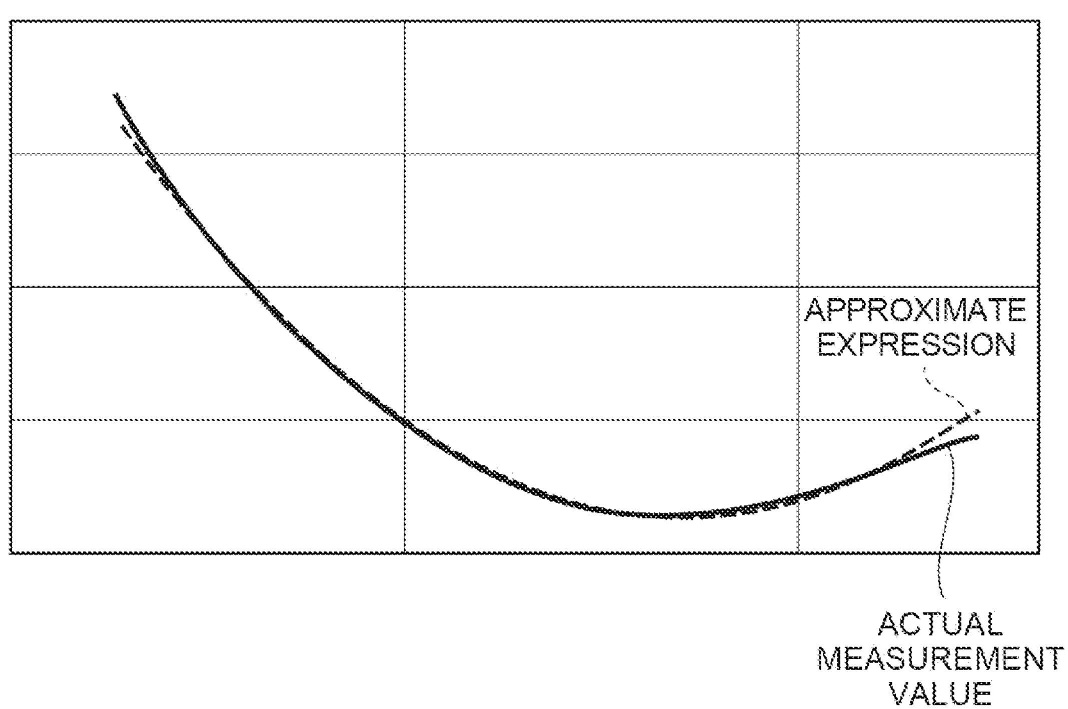
FIG. 4 is a view in which an edge of a tip portion (for example, the left half) of a glass fine particle deposit is indicated by an approximate value (dotted line) and an actual measurement value (solid value) and shows a case in which the tip portion has not deformed.
Figure 5:
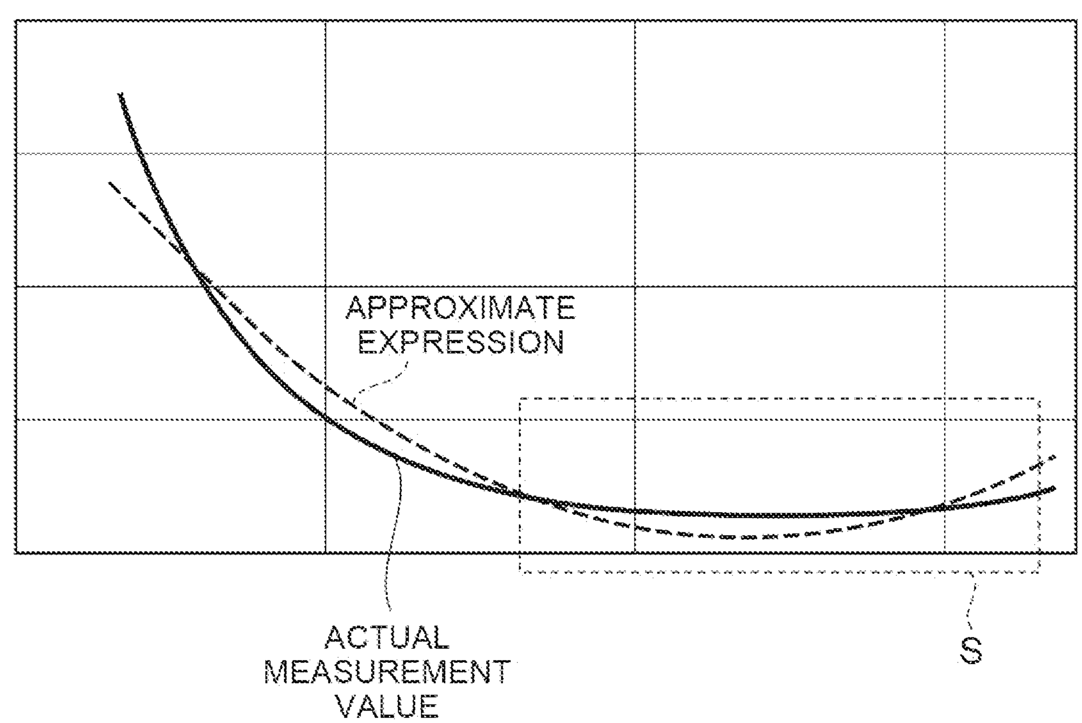
FIG. 5 is a view in which an edge of a tip portion (for example, the left half) of a glass fine particle deposit is indicated by an approximate value (dotted line) and an actual measurement value (solid value) and shows a case in which the tip portion has deformed in a flat manner.

First, in calculation of the deformation amount in (1) deformation of the tip portion H1 of the glass fine particle deposit 100 (flat tip/projection), as illustrated in FIGS. 4 and 5, the image processing unit 32 stores the expression (dotted line) approximating a regular shape in the tip portion H1 of the glass fine particle deposit 100 in advance. Such an expression can be approximated by a polynomial expression, for example. FIG. 4 is a view in which an edge of a tip portion of a glass fine particle deposit (mainly the left half) is indicated by an approximate value (dotted line) and an actual measurement value (solid value), and shows a case in which both substantially coincide with each other and the tip portion has not deformed. An actual measurement value is prepared on the basis of a deposition surface image acquired using the imaging device 20. On the other hand, FIG. 5 is a view in which an edge of a tip portion of a glass fine particle deposit (mainly the left half) is indicated by an approximate value (dotted line) and an actual measurement value (solid value), and shows a case in which a deviation has occurred therebetween and the tip portion has deformed.

Figure 6:
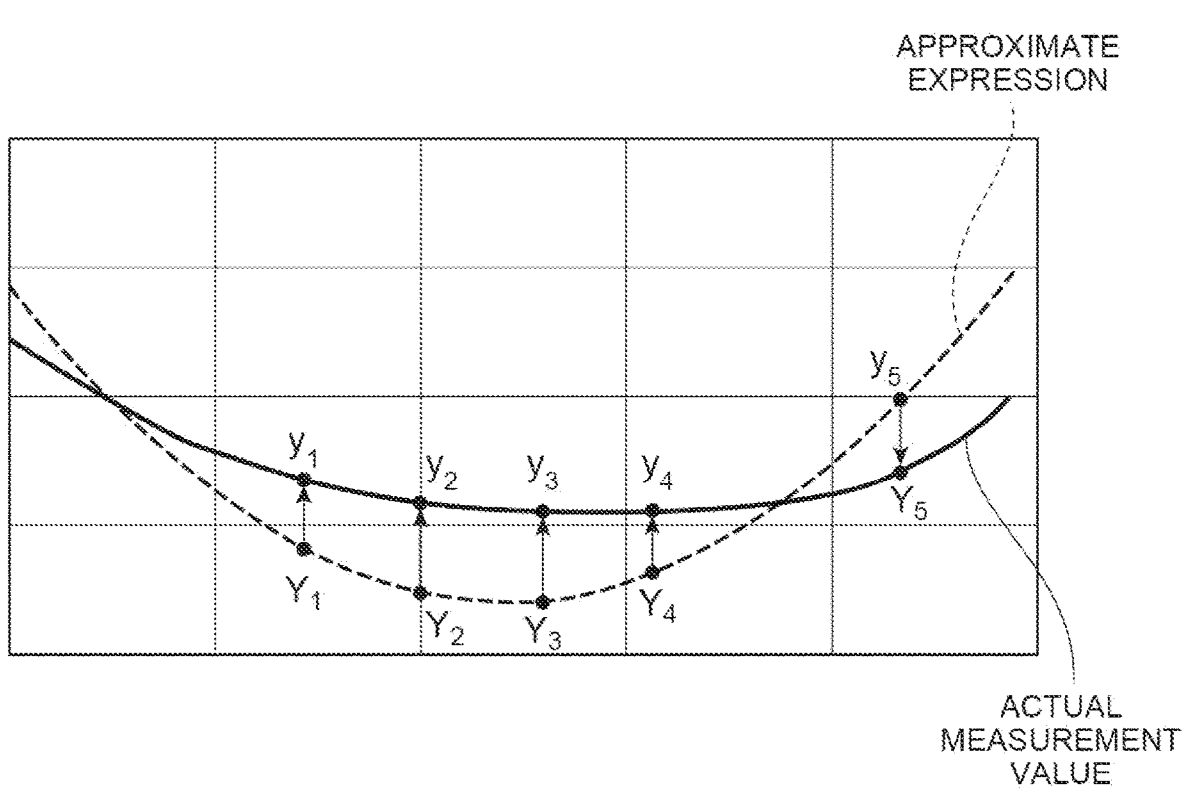
FIG. 6 is an enlarged view of a region S indicated in FIG. 5 and is a view showing an example of a residual between the approximate value (dotted line) and the actual measurement value (solid value).

In the image processing unit 32, when an actual measurement value deviates from the expression approximating a regular shape, in the region S of deviation, as illustrated in FIG. 6, a residual yi-Yi between an actual measurement value and an approximate value is calculated. Next, the sum of squares of the residual is calculated, and an unbiased variance is calculated from this. Such calculation is also performed in other regions of deviation. Further, these are defined as the deformation amount of (1) deformation of the tip portion H1 of the glass fine particle deposit 100 (flat tip/projection). In the image processing unit 32, on the basis of such a deformation amount, regarding deformation such as a flat tip or a reversed projection, the quality of the glass fine particle deposit 100 is judged by judging whether or not data of the deposition surface image acquired using the imaging device 20 exceeds a predetermined threshold, and the deformation amount is stored as production data. When it is judged that the glass fine particle deposit 100 is defective, data of the deformation amount (or data with respect to defect) and positional data (pulling-up length) of the glass fine particle deposit 100 in the axial direction corresponding thereto are associated with each other and stored in the memory or the like by the data preparation unit 33.

Figure 7:
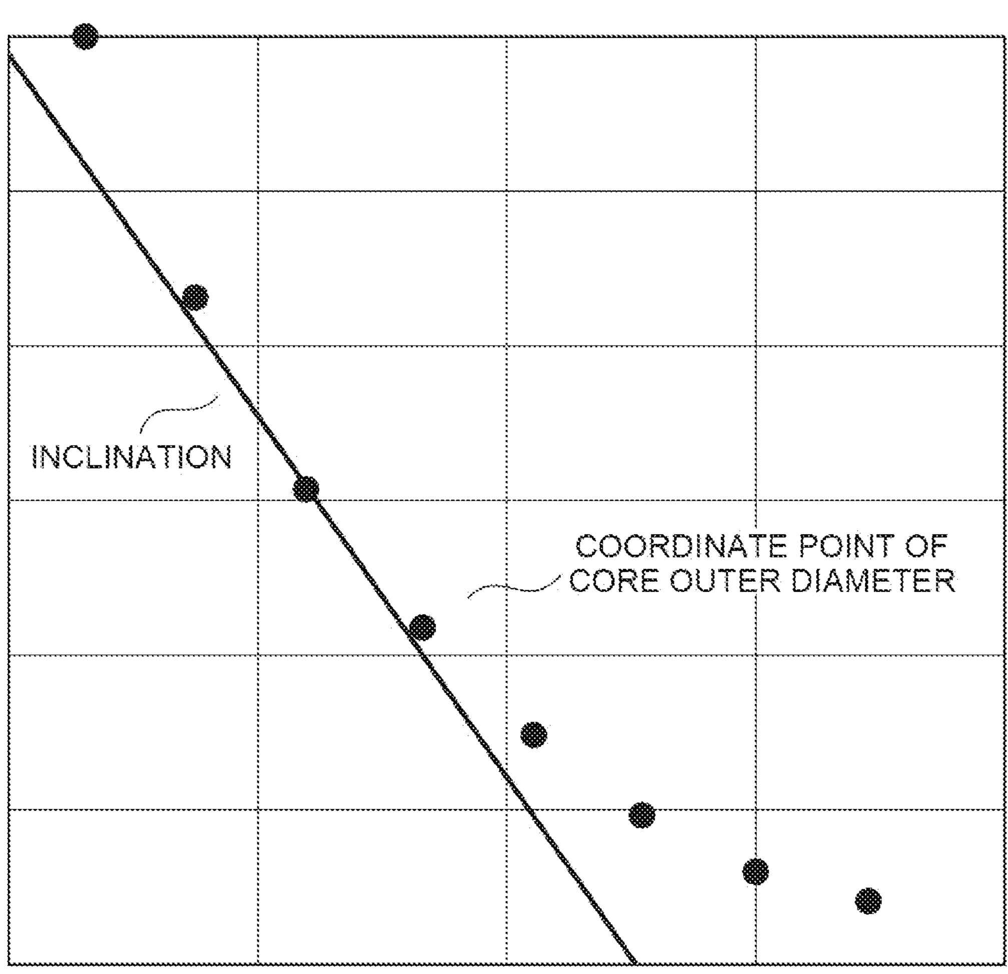
FIG. 7 is a view schematically showing an inclination of an inclined part of a glass fine particle deposit.

Next, in (2) rotationally asymmetric deformation in the tip portion H2 of the glass fine particle deposit 100, as illustrated in FIG. 7, an inclination of an edge portion is calculated by performing numerical differentiation (central difference) of a coordinate point of a core outer diameter from an extracted image. Then, the image processing unit 32 obtains an amount of change in inclination data during a first predetermined time (during several seconds). Thereafter, the image processing unit 32 calculates an amount of variation of change in inclination within a designation range for each inclination analysis range. This is defined as a deformation amount of (2) rotationally asymmetric deformation in the tip portion H2 of the glass fine particle deposit 100. Regarding rotationally asymmetric deformation in a tip, the image processing unit 32 judges the quality of the glass fine particle deposit 100 by judging whether or not data of the deposition surface image acquired using the imaging device 20 exceeds the predetermined threshold on the basis of such a deformation amount, and stores the deformation amount as production data. When it is judged that the glass fine particle deposit 100 is defective, data of the deformation amount (or data with respect to defect) and positional information of the glass fine particle deposit 100 in the axial direction corresponding thereto are associated with each other and stored in the memory or the like by the data preparation unit 33.

Next, (3) regarding deformation on the side surface 103 of the glass fine particle deposit 100, although it is different from a measurement site of (2) rotationally asymmetric deformation in the tip portion H2 of the glass fine particle deposit 100, the deformation amount on the side surface can be defined by a similar technique. Regarding deformation on the side surface, the image processing unit 32 judges the quality of the glass fine particle deposit 100 by judging whether or not data of the deposition surface image acquired using the imaging device 20 exceeds the predetermined threshold on the basis of such a deformation amount, and stores the deformation amount as production data. When it is judged that the glass fine particle deposit 100 is defective, data of the deformation amount (or data with respect to defect) and positional information of the glass fine particle deposit 100 in the axial direction corresponding thereto are associated with each other and stored in the memory or the like by the data preparation unit 33.

Returning to FIG. 1, description will continue. The data preparation unit 33 is a part for preparing production data obtained by associating data of each deformation amount (degree of deformation) quantified (digitized) by the image processing unit 32 with positional data of the glass fine particle deposit 100 in the axial direction corresponding to this data of the deformation amount. When the data preparation unit 33 acquires data of the deformation amount quantified by the image processing unit 32, for example, data of the glass fine particle deposit 100 having a certain part regarded as defective from the image processing unit 32, positional data of the defective part in the axial direction is calculated from the amount of movement of the support rod 13 in the lifting/lowering rotation device 14, processing for associating both with each other, and the foregoing production data is prepared. The data preparation unit 33 may store the prepared production data in a memory (not illustrated) of the control device 30 and output it from the input/output unit 34 to an external apparatus. In the external apparatus, the acquired production data may be used for quality control of a glass preform or may be used for discarding the defective part after a step of dehydration/sintering.

The input/output unit 34 outputs production data prepared by the data preparation unit 33 to an external apparatus or the like. When a defect due to deformation of the glass fine particle deposit 100 is judged by the image processing unit 32, the input/output unit 34 performs a predetermined notification such as issuance of an alarm or the like. Regarding this notification, a fact that a defect due to deformation of the glass fine particle deposit 100 has occurred may be radio-transmitted to an information terminal carried by a production manager together with an identification number of a target production apparatus. Particularly, when many apparatuses 10 for producing a glass preform are managed by a small number of workers, it is possible to ascertain the apparatus in which a defect has occurred or the kind of defect (the kind of deformation) in an early stage by means of this notification, and it is possible to reduce an elimination part of the glass fine particle deposit 100 by adjustment such as change of production conditions.

Figure 8:
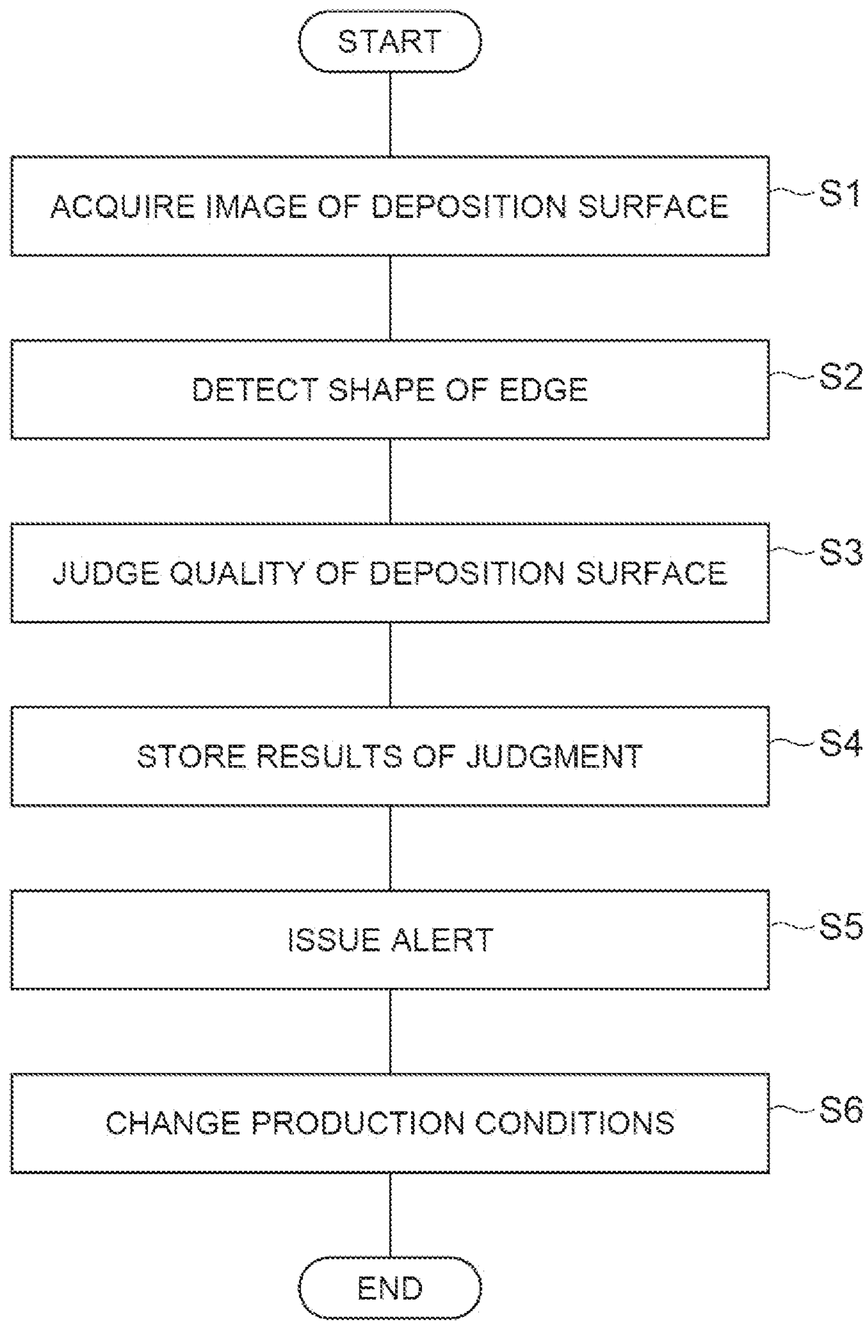
FIG. 8 is a flowchart showing a method for producing a glass preform using an apparatus for producing a glass preform illustrated in FIG. 1.

Next, a method for producing a glass preform using the foregoing production apparatus 10 for a glass preform will be described with reference to FIG. 8. FIG. 8 is a flowchart showing a method for producing a glass preform using the production apparatus 10 for a glass preform.

First, by control of the control device 30, while the starting rod 12 is rotated around the axis by driving the lifting/lowering rotation device 14, glass fine particles generated by the burners 15 and 16 are deposited in the axial direction of the starting rod 12. Then, in a process of producing the glass fine particle deposit 100, deposition surface images of the deposition surface 105 of the glass fine particle deposit 100 are continuously acquired by the imaging device 20 (Step S1). During the taking images, with respect to the deposition surface 105 of the glass fine particle deposit 100, deposition surface images may be acquired by performing irradiation from the light source 25 with light having a wavelength of 300 nm to 600 nm. During the taking images, deposition surface images may be acquired through the optical filter 22 having light transmission characteristics which pass through light having any wavelength range within a wavelength range of 350 nm to 510 nm.

Subsequently, the deposition surface images (motion video data) acquired using the imaging device 20 are sent to the image processing unit 32, the shape of the edge portion is detected by the image processing unit 32 (Step S2), and quality judgment of the deposition surface is performed (Step S3). In these Steps S2 and S3, a deposition surface image is obtained by deriving still image data from the motion video data, and the presence or absence of deformation on the deposition surface 105 of the glass fine particle deposit 100 is judged, for example, by kind of deformation as follows.

(1) Deformation of tip portion H1 of glass fine particle deposit 100 (flat tip/projection)

(2) Rotationally asymmetric deformation in tip portion H2 of glass fine particle deposit 100

(3) Deformation on side surface H3 of glass fine particle deposit 100

A judgment method for each kind of deformation in the image processing unit 32 is as described above. However, in the image processing unit 32, the presence or absence of deformation on the deposition surface 105 is judged by comparing the deformation amount for each kind of deformation to the predetermined threshold. Regarding this predetermined threshold, different values are set by kind of deformation. The threshold may be set with reference to a part or all of data of the deformation amounts acquired in the past. Further, when it is judged that there is deformation, as described above, the deformation amount is quantitatively calculated and stored for each kind of deformation (Step S4). Moreover, in the image processing unit 32, when any deformation amount for each kind of deformation significantly exceeds the predetermined threshold, it may be judged as deformation due to cracking of the glass fine particle deposit or deformation due to adhesion of foreign matter to the glass fine particle deposit. Judgment can be made by suitably setting a predetermined threshold for each of deformation due to cracking of the glass fine particle deposit and deformation due to adhesion of foreign matter to the glass fine particle deposit for distinguishment.

Subsequently, when the image processing unit 32 judges that the deposition surface 105 of the glass fine particle deposit 100 has deformed, namely, is defective, production data obtained by associating data of the deformation amount quantified by the image processing unit 32 with the positional data of the glass fine particle deposit 100 in the axial direction corresponding to this data of the deformation amount is prepared and stored in the memory or the like by the data preparation unit 33 (Step S4).

When the image processing unit 32 judges that the deposition surface 105 of the glass fine particle deposit 100 has deformed, namely, is defective, an alert may be issued through the input/output unit 34 (Step S5), and/or the production conditions may be changed (Step S6).

When the production conditions are changed in Step S6, the production conditions are changed by the apparatus control unit 31 of the control device 30 in accordance with the kind of deformation on the deposition surface 105 of the glass fine particle deposit 100. For example, in the case of (1) deformation of the tip portion H1 of the glass fine particle deposit 100 (flat tip/projection), the apparatus control unit 31 can adjust the tip shape of the deposition surface 105 by driving the stage 18 or the like to perform movement along a Y axis (a direction perpendicular the rotation axis of the starting rod 12 and perpendicular to a burner central axis) of the core burner 15 or movement along an X axis (a direction perpendicular to the Y axis and perpendicular to the burner central axis) of the core burner 15. In the case of (2) rotationally asymmetric deformation in the tip portion H2 of the glass fine particle deposit 100, the apparatus control unit 31 can adjust the rotationally asymmetrical shape of the tip of the deposition surface 105 by driving the stage 18 or the like to mainly perform adjustment along the Y axis described above. In the case of (3) deformation on the side surface H3 of the glass fine particle deposit 100, the apparatus control unit 31 can adjust the shape of the side surface of the deposition surface 105 by controlling the gas supply system 17 or the like to adjust the gas flow rate of the core burner 15. These production conditions may be manually changed by a production manager or may be automatically changed in accordance with predetermined data which has been input to the control device 30.

A fact that a defect due to deformation of the glass fine particle deposit 100 has occurred may be radio-transmitted to an information terminal (a smartphone or the like) carried by a production manager through the input/output unit 34 together with an identification number of a target production apparatus. In this case, information regarding the kind of deformation or a method for changing the production conditions according to the kind of deformation (the foregoing method), and the like may also be transmitted to an information terminal carried by a production manager. Due to transmission of such information, even a production manager who particularly manages many apparatuses for producing a glass preform or an inexperienced production manager can promptly respond to deformation of a glass fine particle deposit, and thus a glass preform can be more efficiently produced.

Hereinabove, the production apparatus 10 for a glass preform according to the present embodiment includes the image processing unit 32 to detect the edge shape of the deposition surface 105 from the deposition surface image acquired using the imaging device 20 and judge the quality of the glass fine particle deposit 100 by quantifying the degree of deformation of the edge shape. In this case, instead of simple image comparison, the quality of the glass fine particle deposit 100 is judged by quantifying the degree of deformation of the edge shape in the deposition surface image, and thus finer judgment can be performed. Accordingly, it is possible to promptly respond to deformation of the glass fine particle deposit 100. Since the degree of deformation on the deposition surface 105 during production of a glass preform is quantified (digitized) in this manner, a large amount of production data can be used for analysis, and thus prediction of deformation and automation or simplification of maintenance of the production apparatus can also be achieved.

In the production apparatus 10 for a glass preform, the image processing unit 32 judges the quality through quantification by classifying degrees of deformation of the edge shape by kind of deformation. For this reason, judgement of the quality of the glass fine particle deposit 100 can be more finely performed, and thus it is possible to more promptly respond to deformation of the glass fine particle deposit 100.

The production apparatus 10 for a glass preform further includes the data preparation unit 33 to prepare production data obtained by associating data of the degree of deformation quantified by the image processing unit 32 with positional data (pulling-up length) of the glass fine particle deposit 100 in the axial direction corresponding to the data of the degree of deformation. For this reason, a part of the glass fine particle deposit 100 regarded as defective by quality judgment can be more precisely removed in succeeding steps (for example, steps after the step of dehydration/sintering and the step of stretching). That is, if the range regarded as defective in quality judgment is unclear, there is a need to discard a glass preform constituted of the glass fine particle deposit over the entire length thereof, or in the case of partial discarding, there is a need to discard a generous amount thereof in consideration of safety. However, only a defective part can be more precisely removed by preparing such production data.

In the method for producing a glass preform according to the present embodiment, the edge shape of the deposition surface 105 is detected from the deposition surface image, and the quality of the glass fine particle deposit 100 is judged by quantifying the degree of deformation of the detected edge shape. In this case, instead of simple image comparison, the quality of the glass fine particle deposit 100 is judged by quantifying the degree of deformation of the edge shape in the deposition surface image, and thus finer judgment can be performed. Accordingly, it is possible to promptly respond to deformation of the glass fine particle deposit 100. Since the degree of deformation on the deposition surface during production of a glass preform is quantified (digitized) in this manner, a large amount of production data can be used for analysis, and thus prediction of deformation and automation or simplification of maintenance of the production apparatus can also be achieved.

In the step of judging quality in this production method, the quality is judged through quantification by classifying degrees of deformation of the edge shape by kind of deformation. For this reason, quality judgment of the glass fine particle deposit can be more finely performed, and thus it is possible to more promptly respond to deformation of the glass fine particle deposit 100.

This production method further includes a step of changing production conditions of the glass fine particle deposit 100 on the basis of the degree of deformation quantified in the step of judging quality and the kind of deformation. For this reason, the production conditions can be more promptly changed with respect to the glass fine particle deposit 100 in which deformation has occurred, and thus a defective part of the glass fine particle deposit 100 can be made shorter.

In the step of acquiring an image in this production method, a deposition surface image may be acquired by irradiating the deposition surface of the glass fine particle deposit 100 with light having a wavelength of 300 nm to 600 nm from the light source. In the method for producing an optical fiber preform, strong light is emitted from flames of the burner. However, an image is acquired by performing irradiation with such light, and thus an edge part of the glass fine particle deposit can be made clearer and image processing can be facilitated. Accordingly, accuracy of judgment based on the deposition surface image in the step of judging quality can be enhanced.

In the step of acquiring an image in this production method, the deposition surface image may be acquired through the optical filter 22 having light transmission characteristics which pass through light having any wavelength range within a wavelength range of 350 nm to 510 nm. In the method for producing an optical fiber preform, strong light is emitted from flames of the burner. However, an image is acquired through the optical filter 22, and thus the edge part of the glass fine particle deposit 100 can be made clearer and image processing can be facilitated. Accordingly, accuracy of judgment based on the deposition surface image in the step of judging quality can be enhanced.

This method for producing a glass preform may further include a step of issuing a predetermined notification when the degree of deformation exceeds a predetermined value in the step of judging quality. In this case, necessary measures can be taken in an early stage with respect to deformation of the glass fine particle deposit 100 which has been more finely judged.

This method for producing a glass preform may further include a step of removing a defective part inside the glass fine particle deposit 100 on the basis of production data obtained by associating data of the degree of deformation quantified by the image processing unit 32 with positional data of the glass fine particle deposit 100 in the axial direction corresponding to the data of the degree of deformation. In this case, a part of the glass fine particle deposit 100 regarded as defective by quality judgment can be more precisely removed in a succeeding step (for example, a step after the step of dehydration/sintering and the step of stretching). That is, if the range regarded as defective in quality judgment is unclear, there is a need to discard a glass preform constituted of the glass fine particle deposit over the entire length thereof, or in the case of partial discarding, there is a need to discard a generous amount thereof in consideration of safety. However, only a defective part can be more precisely removed by preparing such production data.

Hereinabove, the embodiment of the present disclosure has been described in detail, but the present invention is not limited to the foregoing embodiment and can be applied to various embodiments. For example, the control device 30 described above may be one integrated control device with respect to a plurality of apparatuses 10 for producing a glass preform.

The embodiment of the present disclosure may be applied to an OVD method as described above. The apparatus for producing a glass preform used in this case is a production apparatus causing glass fine particles generated by a burner to be deposited in the outer periphery of a starting rod while the starting rod is rotated around an axis and the burner is subjected to relative reciprocating movement with respect to the starting rod in the axial direction of the starting rod. This apparatus for producing a glass preform includes an imaging device to acquire a deposition surface image by imaging a deposition surface of the glass fine particle deposit deposited on the starting rod, and an image processing unit to detect an edge shape of the deposition surface from the deposition surface image acquired using the imaging device and judge quality of the glass fine particle deposit by quantifying the degree of deformation of the edge shape.

In a method for producing a glass preform when the embodiment described above is applied to an OVD method, glass fine particles generated by a burner are deposited in the outer periphery of a starting rod while the starting rod is rotated around an axis and the burner is subjected to relative reciprocating movement with respect to the starting rod in the axial direction of the starting rod. This method for producing a glass preform includes a step of acquiring a deposition surface image by imaging a deposition surface of the glass fine particle deposit deposited on the starting rod, a step of detecting an edge shape of the deposition surface from the deposition surface image, and a step of judging quality of the glass fine particle deposit by quantifying the degree of deformation of the detected edge shape.

When the embodiment described above is applied to an OVD method, the kind of deformation detected by the image processing unit 32 may be regarded as deformation on the side surface of the glass fine particle deposit, and in the image processing unit 32, quality judgment may be performed by quantifying the degree of deformation of the edge shape based on this kind of deformation. In this case, in order to reduce reflection of a soot flow or the like floating inside a reaction container, it is preferable that the imaging device 20 be installed on the same side as the burner or on a side opposite to the burner with respect to the deposition surface, for example.

The foregoing apparatus for producing a glass preform which can be applied to an OVD method may have one burner or may have a plurality of burners. When the production apparatus has a plurality of burners, and when each burner is subjected to relative reciprocating movement with respect to the starting rod by a length corresponding to the interval between the burners, for example, a plurality of imaging devices 20 may be installed. Using such an apparatus for producing a glass preform, each imaging device 20 may image the shape of the deposition surface corresponding to each burner, and quality judgment may be performed by quantifying the deformation amount of each deposition surface.

Even in an OVD method, the quality of the glass fine particle deposit is judged by quantifying the degree of deformation of the edge shape in the deposition surface image, and thus finer judgment can be performed. According to the apparatus for producing a glass preform and the method for producing a glass preform according to the embodiment of the present disclosure, it is possible to promptly respond to deformation of the glass fine particle deposit. Since the degree of deformation on the deposition surface during production of a glass preform is quantified (digitized) in this manner, a large amount of production data can be used for analysis, and thus prediction of deformation and automation or simplification of maintenance of the production apparatus can also be achieved. Moreover, even when the embodiment of the present disclosure is applied to an OVD method, in addition to deformation of a glass fine particle deposit (deformation on the side surface), it is also possible to detect cracking on the deposition surface of glass fine particles or adhesion of foreign matter to the glass fine particle deposit based on the calculated deformation amount. If cracking on the deposition surface of glass fine particles or adhesion of foreign matter can be promptly detected, production of a glass fine particle deposit which may become a defect can be promptly stopped.

REFERENCE SIGNS LIST

10 Production apparatus for glass preform
11 Reaction container
**11*a*** Exhaust duct
12 Starting rod
13 Support rod
14 Lifting/lowering rotation device
15 Core burner
16 Cladding burner
17 Gas supply system
18, 19 Stage
**18*a*, 19*a*** Angle adjustment mechanism
20 Imaging device
21 Camera unit
22 Optical filter
25 Light source
30 Control device
31 Apparatus control unit
32 Image processing unit
33 Data preparation unit
34 Input/output unit
100 Glass fine particle deposit

105, 105*a*, 105*b*, 105*c*, 105*d* Deposition surface

H, H1, H2 Tip portion

H3 Side surface

S Region

S1 Turning operation

S2 Lifting/lowering operation

The invention claimed is:

1. A method for producing a glass preform, the method comprising:

producing a glass fine particle deposit on a starting rod by pulling up a starting rod while the starting rod is rotated around an axis and glass particles generated by a burner are deposited in an axial direction of the starting rod;

acquiring a deposition surface image by imaging a deposition surface of the glass fine particle deposit deposited on the starting rod;

detecting an edge shape of the deposition surface from the deposition surface image;

determining a quality of the glass fine particle deposit by quantifying a degree of deformation of the detected edge shape and classifying the degree of deformation of the edge shape by kind of deformation; and changing a production condition for the glass fine particle deposit based on the kind of deformation quantified in the determining a quality step, wherein the change to the production condition comprises:

adjusting a tip shape of the deposition surface by moving the burner in Y-axis and X-axis directions using a stage;

adjusting a rotationally asymmetrical shape of a tip of the deposition surface by adjusting a Y-axis of the burner using a stage; or adjusting a shape of a side surface of the deposition surface by controlling a gas flow rate of a core burner, and wherein in the acquiring a deposition surface image step, the deposition surface image is acquired through an optical filter having light transmission characteristics which pass through light having any wavelength range within a wavelength range of 350 nm to 510 nm.

2. The method for producing a glass preform according to claim 1, wherein the kind of deformation includes deformation of a tip portion of the glass fine particle deposit, rotationally asymmetric deformation in a tip portion of the glass fine particle deposit, and deformation on a side surface of the glass fine particle deposit.

3. The method for producing a glass preform according to claim 2, wherein the kind of deformation further includes deformation due to cracking of the glass fine particle deposit or deformation due to adhesion of foreign matter to the glass fine particle deposit.

4. The method for producing a glass preform according to claim 1, wherein in the acquiring a deposition surface image step, the deposition surface image is acquired by irradiating the deposition surface of the glass fine particle deposit with light having a wavelength of 300 nm to 600 nm from a light source.

5. The method for producing a glass preform according to claim 1, further comprising:

issuing a predetermined notification when the degree of deformation exceeds a predetermined value in the determining quality step.

6. The method for producing a glass preform according to claim 1, further comprising:

removing a defective part within the glass fine particle deposit based on the production data obtained by associating data of the degree of deformation quantified in the determining quality step with positional data of the glass fine particle deposit in the axial direction corresponding to the data of the degree of deformation.

* * * * *